(12) United States Patent
Yang (10) Patent No.: US 8,513,932 B2
(45) Date of Patent: Aug. 20, 2013

(54) DC/DC BOOST CONVERTER

(75) Inventor: Chen-Hao Yang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 54 days.

(21) Appl. No.: 13/197,710

(22) Filed: Aug. 3, 2011

(65) Prior Publication Data

US 2012/0229114 A1 Sep. 13, 2012

(30) Foreign Application Priority Data

Mar. 7, 2011 (TW) .............................. 100107508 A (51) Int. Cl.
*G05F 1/40* (2006.01)
(52) U.S. Cl.
USPC ......................................................... 323/282
(58) Field of Classification Search
USPC ................. 323/222, 225, 232, 259, 271, 282, 323/351
See application file for complete search history.

(56) References Cited

U.S. PATENT DOCUMENTS

| | | | | |
|---|---|---|---|---|
| 4,384,321 A * | 5/1983 | Rippel | ........................... | 363/124 |
| 5,278,489 A * | 1/1994 | Bowers | ........................... | 323/225 |
| 5,321,600 A * | 6/1994 | Fierheller | ........................ | 363/65 |
| 5,977,754 A | 11/1999 | Cross | | |
| 6,084,790 A | 7/2000 | Wong | | |
| 7,023,186 B2 | 4/2006 | Yan | | |
| 7,659,767 B2 * | 2/2010 | Chen et al. | ...................... | 327/333 |
| 8,248,283 B2 * | 8/2012 | Mandal et al. | ................. | 341/141 |
| 2005/0017699 A1 * | 1/2005 | Stanley | ......................... | 323/282 |
| 2006/0238179 A1 * | 10/2006 | Harris et al. | ................... | 323/272 |
| 2008/0225560 A1 * | 9/2008 | Yang et al. | ........................ | 363/71 |
| 2009/0257257 A1 * | 10/2009 | Adragna et al. | ............... | 363/65 |
| 2011/0188273 A1 * | 8/2011 | Pansier et al. | .................... | 363/44 |

FOREIGN PATENT DOCUMENTS

EP 0929143 A2 7/1999

* cited by examiner

*Primary Examiner* — Adolf Berhane
(74) *Attorney, Agent, or Firm* — Winston Hsu; Scott Margo (57) ABSTRACT

A DC/DC boost converter includes a first boost driving unit, a second boost driving unit connected in parallel with the first boost driving unit, and a capacitor electrically connected to the first and second boost driving units. The first boost driving unit is utilized for performing a first driving operation according to an input voltage and a first control signal. The first driving operation includes a first energy-storing operation and a first energy-releasing operation. The second boost driving unit is utilized for performing a second driving operation according to the input voltage and a second control signal different from the first control signal. The second driving operation includes a second energy-storing operation and a second energy-releasing operation. The first and second energy-releasing operations are employed to alternately charge the capacitor for generating an output voltage.

9 Claims, 5 Drawing Sheets

DC/DC BOOST CONVERTER

BACKGROUND

1. Technical Field

The description relates to a DC/DC boost converter, and more particularly, to a DC/DC boost converter having alternate boost driving mechanism.

2. Description of the Related Art

Figure 1:
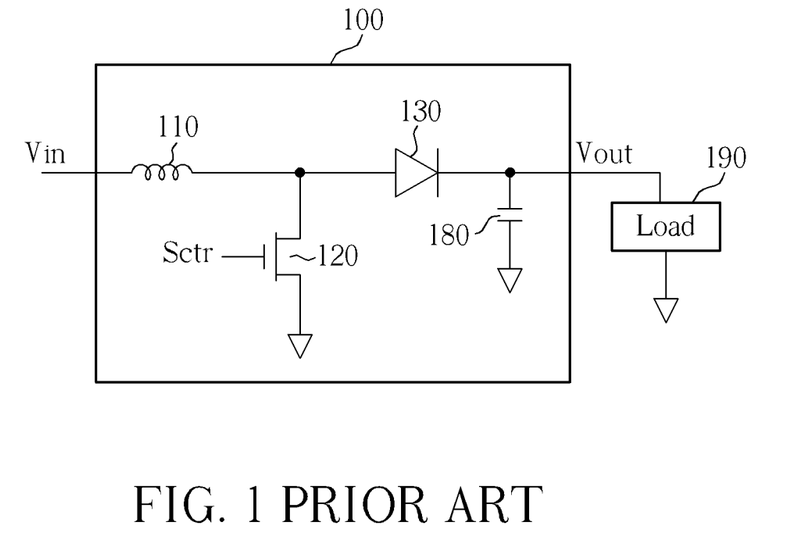
FIG. 1 is a circuit diagram schematically showing a prior-art DC/DC boost converter based on single-phase operation mechanism.

Along with a demand of providing different DC voltages for use in a variety of components installed in complicated electronic apparatuses, such as liquid crystal displays or computer hosts, a DC/DC boost converter disposed therein is required to boost a DC voltage generated by a power supply so as to provide a higher DC voltage for driving part of the components to function properly. FIG. 1 is a circuit diagram schematically showing a prior-art DC/DC boost converter based on single-phase operation mechanism. As shown in FIG. 1, the DC/DC boost converter 100 includes an inductor 110, a power switch 120, a power diode 130, and an output capacitor 180. The DC/DC boost converter 100 is employed to perform a DC voltage boost operation on an input voltage Vin for generating an output voltage Vout furnished to a load 190. In the single-phase boost operation of the DC/DC boost converter 100, the power switch 120 is required to perform a high-frequency operation of periodically switching turn-on/turn-off states according to a control signal Sctr, for controlling the energy-storing/energy-releasing operations of the inductor 110. And the energy-releasing operation of the inductor 110 is employed to charge the output capacitor 180 via the power diode 130, thereby generating the output voltage Vout. That is, in the aforementioned single-phase boost operation, the energy-storing operation of the inductor 110 is performed by a current flowing through the power switch 120, and the charging operation of the output capacitor 180 is performed by a current flowing through the inductor 110 and the power diode 130. In view of that, the power switch 120, the inductor 110 and the power diode 130 are all required to have high current/voltage rating for tolerating high working current/voltage, which leads to high production cost. Besides, high capacitance of the output capacitor 180 is required to reduce the ripple of the output voltage Vout. Further, serious electromagnetic interference (EMI) is likely to occur because of high ripple current flowing through the inductor 110, which causes significant electromagnetic energy loss and thus reduces energy conversion efficiency. Finally, the high-frequency on/off switching operation of the power switch 120 may deteriorate the lifetime thereof.

SUMMARY

In accordance with an embodiment, a DC/DC boost converter having alternate boost driving mechanism is provided. The DC/DC boost converter comprises a first boost driving unit, a second boost driving unit connected in parallel with the first boost driving unit, and a capacitor electrically connected to the first and second boost driving units. The first boost driving unit is utilized for performing a first driving operation according to an input voltage and a first control signal. The first driving operation includes first energy-storing operation and a first energy-releasing operation. The second boost driving unit is utilized for performing a second driving operation according to the input voltage and a second control signal different from the first control signal. The second driving operation includes a second energy-storing operation and a second energy-releasing operation. The first and second energy-releasing operations are employed to alternately charge the capacitor for generating an output voltage.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto.

Figure 2:
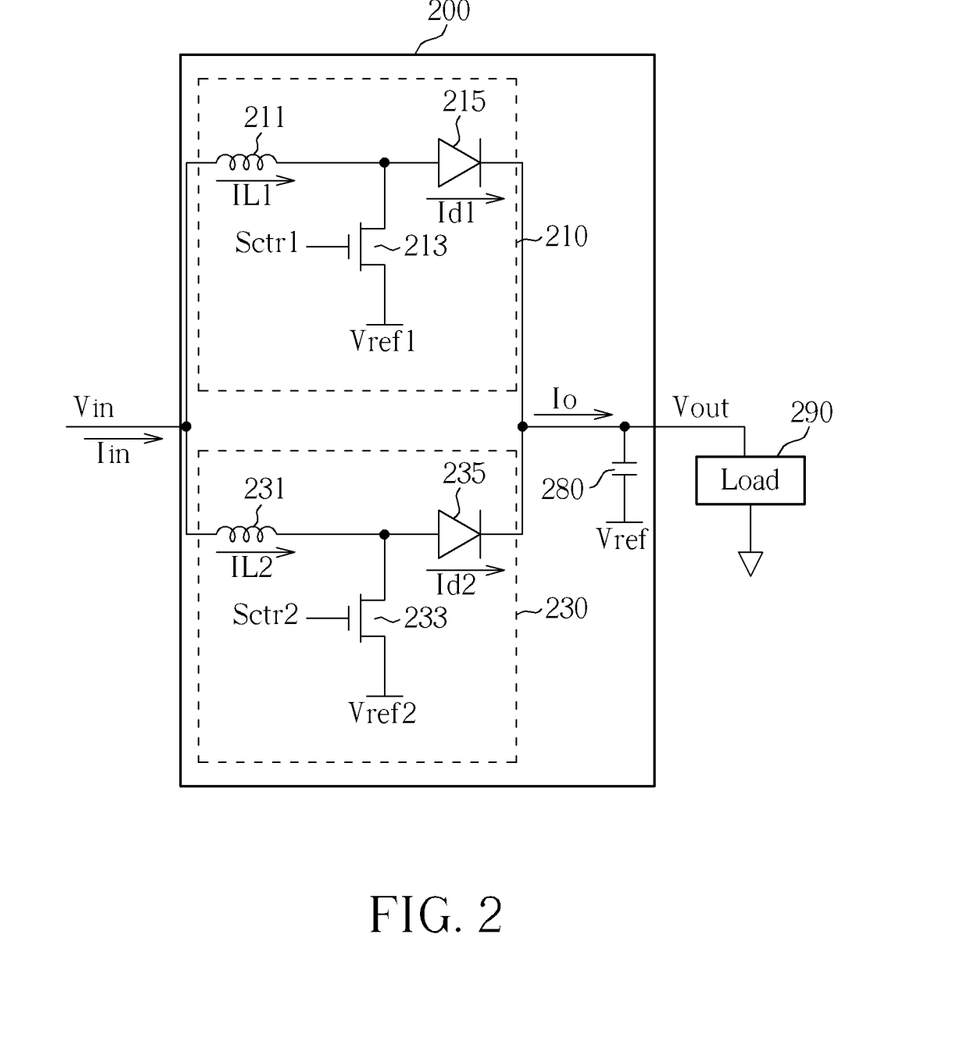
FIG. 2 is a circuit diagram schematically showing a DC/DC boost converter based on two-phase operation mechanism in accordance with a first embodiment.

FIG. 2 is a circuit diagram schematically showing a DC/DC boost converter based on two-phase operation mechanism in accordance with a first embodiment. As shown in FIG. 2, the DC/DC boost converter 200 is employed to perform a DC voltage boost operation on an input voltage Vin according to a first control signal Sctr1 and a second control signal Sctr2, for generating an output voltage Vout furnished to a load 290. The DC/DC boost converter 200 comprises a first boost driving unit 210, a second boost driving unit 230 connected in parallel with the first boost driving unit 210, and a capacitor 280 electrically connected to the first boost driving unit 210 and the second boost driving unit 230. The first boost driving unit 210 is utilized for performing a first driving operation according to the input voltage Vin and the first control signal Sctr1. The first driving operation includes a first energy-storing operation and a first energy-releasing operation. The second boost driving unit 230 is utilized for performing a second driving operation according to the input voltage Vin and the second control signal Sctr2. The second driving operation includes a second energy-storing operation and a second energy-releasing operation.

In the DC voltage boost operation of the DC/DC boost converter 200, when the first boost driving unit 210 performs the first energy-releasing operation for charging the capacitor 280, the second boost driving unit 230 performs the second energy-storing operation. Alternatively, when the second boost driving unit 230 performs the second energy-releasing operation for charging the capacitor 280, the first boost driving unit 210 performs the first energy-storing operation. That is, the first and second energy-releasing operations are alternately performed to charge the capacitor 280 for generating the output voltage Vout, thereby lowering the charging current provided by the first boost driving unit 210 or the second boost driving unit 230, which leads to lower ripple of the output voltage Vout.

In the embodiment shown in FIG. 2, the first boost driving unit 210 comprises a first inductor 211, a first switch 213 and a first diode 215, the second boost driving unit 230 comprises a second inductor 231, a second switch 233 and a second diode 235, and the capacitor 280 comprises a first end and a second end. The first end of the capacitor 280 is electrically connected to the first diode 215 and the second diode 235, and the second end thereof is employed to receive a reference voltage Vref. The reference voltage Vref may be ground voltage. The first inductor 211 comprises a first end for receiving the input voltage Vin and a second end electrically connected to the first switch 213 and the first diode 215. The first switch 213 comprises a first end electrically connected to the second end of the first inductor 211, a gate end for receiving the first control signal Sctr1, and a second end for receiving a first reference voltage Vref1. The first switch 213 may be a field effect transistor (FET) or a thin film transistor (TFT). The first reference voltage Vref1 may be ground voltage. The first diode 215 comprises an anode electrically connected to the second end of the first inductor 211 and a cathode electrically connected to the first end of the capacitor 280.

The second inductor 231 comprises a first end for receiving the input voltage Vin and a second end electrically connected to the second switch 233 and the second diode 235. The second switch 233 comprises a first end electrically connected to the second end of the second inductor 231, a gate end for receiving the second control signal Sctr2, and a second end for receiving a second reference voltage Vref2. The second switch 233 may be a field effect transistor or a thin film transistor. The second reference voltage Vref2 may be ground voltage. The second diode 235 comprises an anode electrically connected to the second end of the second inductor 231 and a cathode electrically connected to the first end of the capacitor 280.

Figure 3:
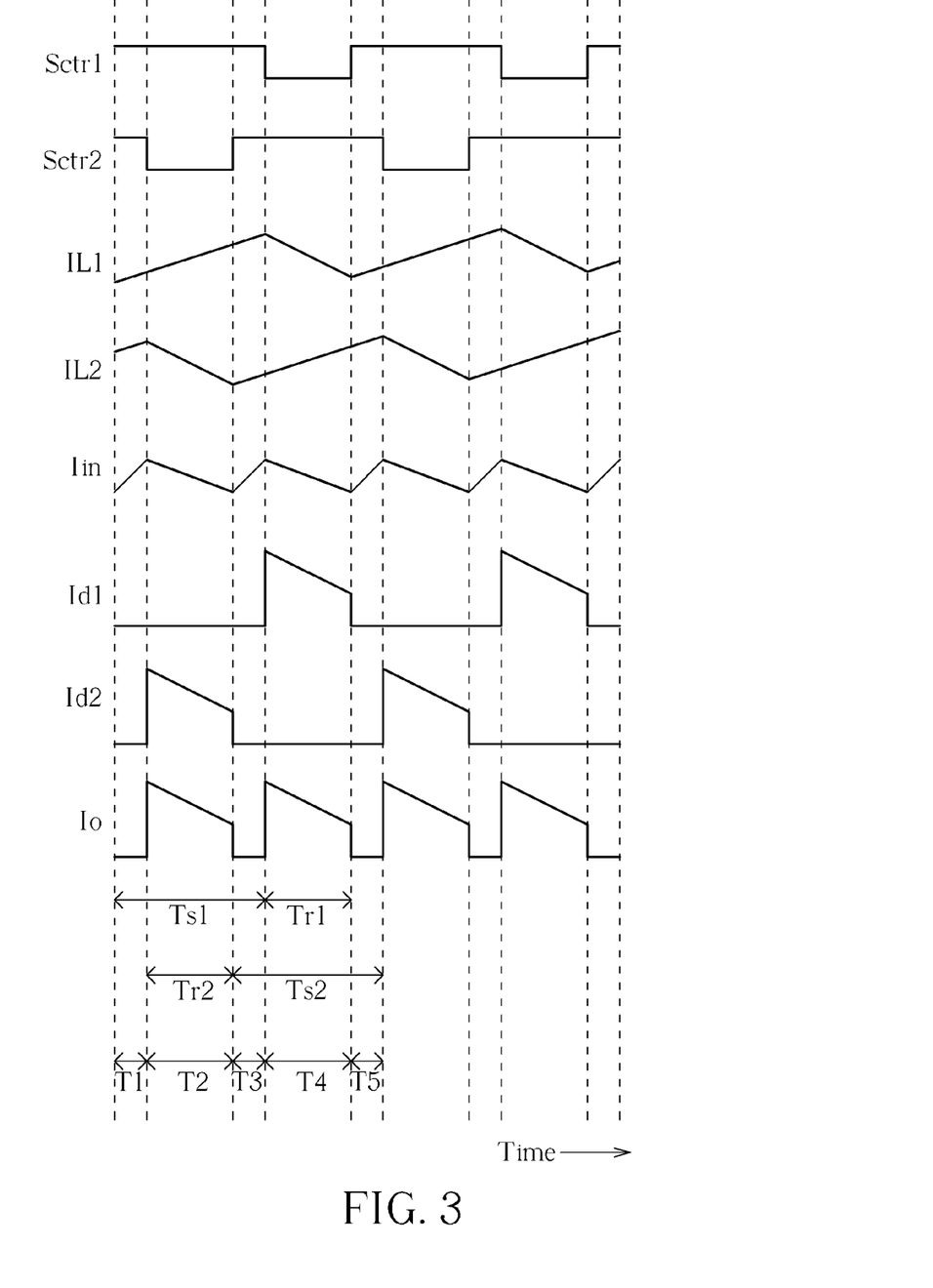
FIG. 3 is a schematic diagram showing related signal waveforms regarding the operation of the DC/DC boost converter illustrated in FIG. 2, having time along the abscissa.

FIG. 3 is a schematic diagram showing related signal waveforms regarding the operation of the DC/DC boost converter 200 illustrated in FIG. 2, having time along the abscissa. The signal waveforms in FIG. 3, from top to bottom, are the first control signal Sctr1, the second control signal Sctr2, a first inductor current IL1, a second inductor current IL2, an input current Iin, a first diode current Id1, a second diode current Id2, and an output current Io. Referring to FIG. 3 in conjunction with FIG. 2, during an interval T1, the first switch 213 is turned on according to the first control signal Sctr1 having a first level, and the second switch 233 is turned on according to the second control signal Sctr2 having the first level, such that the first and second energy-storing operations can be performed to raise the first inductor current IL1 of the first inductor 211 and the second inductor current IL2 of the second inductor 231 respectively, thereby increasing the input current Iin. Meanwhile, the first diode 215 and the second diode 235 are both reversely biased, i.e. in a turn-off state. During an interval T2, the first control signal Sctr1 having the first level continues turning on the first switch 213, and the second switch 233 is turned off according to the second control signal Sctr2 having a second level different from the first level, such that the first energy-storing operation can be performed continuously to raise the first inductor current IL1, and the second energy-releasing operation of the second inductor 231 can be performed to charge the capacitor 280 with the second inductor current IL2 flowing through the second diode 235. At this time, the decreasing rate of the second inductor current IL2 is greater than the increasing rate of the first inductor current IL1, and therefore the input current Iin is decreased.

During an interval T3, the first control signal Sctr1 having the first level continues turning on the first switch 213, and the second switch 233 is turned on according to the second control signal Sctr2 having the first level, such that the first energy-storing operation can be performed continuously to raise the first inductor current IL1, and the second energy-storing operation can be performed to raise the second inductor current IL2, thereby increasing the input current Iin. Meanwhile, the first diode 215 and the second diode 235 are both reversely biased. During an interval T4, the first switch 213 is turned off according to the first control signal Sctr1 having the second level, and the second control signal Sctr2 having the first level continues turning on the second switch 233, such that the second energy-storing operation can be performed continuously to raise the second inductor current IL2, and the first energy-releasing operation of the first inductor 211 can be performed to charge the capacitor 280 with the first inductor current IL1 flowing through the first diode 215. At this time, the decreasing rate of the first inductor current IL1 is greater than the increasing rate of the second inductor current IL2, and therefore the input current Iin is decreased. During an interval T5, the second control signal Sctr2 having the first level continues turning on the second switch 233, and the first switch 213 is turned on according to the first control signal Sctr1 having the first level, such that the second energy-storing operation can be performed continuously to raise the second inductor current IL2, and the first energy-storing operation can be performed to raise the first inductor current IL1, thereby increasing the input current Iin. Meanwhile, the first diode 215 and the second diode 235 are both reversely biased.

As shown in FIG. 3, a first energy-storing interval Ts1 for performing the first energy-storing operation includes the intervals T1-T3, a second energy-storing interval Ts2 for performing the second energy-storing operation includes the intervals T3-T5, a first energy-releasing interval Tr1 for performing the first energy-releasing operation is the interval T4, and a second energy-releasing interval Tr2 for performing the second energy-releasing operation is the interval T2. Accordingly, the first energy-releasing interval Tr1 and the second energy-releasing interval Tr2 are non-overlapped, the first energy-storing interval Ts1 includes the second energy-releasing interval Tr2, and the second energy-storing interval Ts2 includes the first energy-releasing interval Tr1. That is, the DC/DC boost converter 200 employs the first and second energy-releasing operations to alternately charge the capacitor 280 for generating the output voltage Vout, thereby reducing the first inductor current IL1 and the second inductor current IL2. Thus, the output current Io for charging the capacitor 280 can be lowered to reduce the ripple of the output voltage Vout. For that reason, the DC/DC boost converter 200 can be constructed by components with low current/voltage rating to bring the cost down. Further, the ripple of the input current Iin can be reduced to mitigate electromagnetic interference, which results in lower electromagnetic energy loss and thus increases energy conversion efficiency. Besides, since the frequency of the first and second control signals Sctr1, Sctr2 can be set to half the frequency of the prior-art control signal Sctr shown in FIG. 1, the on/off state switching frequency of the first switch 213 and the second switch 233 is then significantly reduced for achieving extended lifetime thereof.

Figure 4:
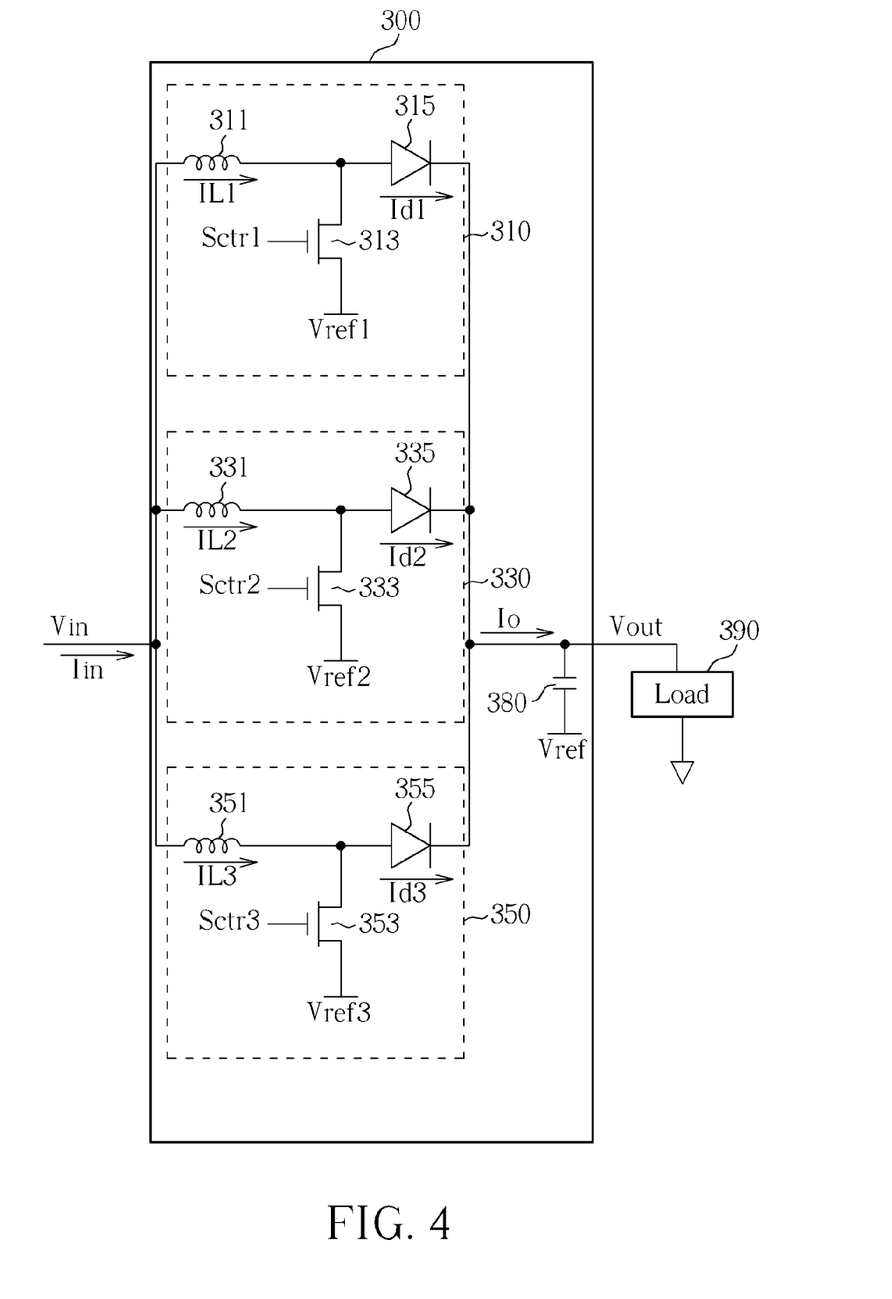
FIG. 4 is a circuit diagram schematically showing a DC/DC boost converter based on three-phase operation mechanism in accordance with a second embodiment.

FIG. 4 is a circuit diagram schematically showing a DC/DC boost converter based on three-phase operation mechanism in accordance with a second embodiment. As shown in FIG. 4, the DC/DC boost converter 300 is employed to perform a DC voltage boost operation on an input voltage Vin according to a first control signal Sctr1, a second control signal Sctr2 and a third control signal Sctr3, for generating an output voltage Vout furnished to a load 390. The DC/DC boost converter 300 comprises a first boost driving unit 310, a second boost driving unit 330 connected in parallel with the first boost driving unit 310, a third boost driving unit 350 connected in parallel with the first boost driving unit 310, and a capacitor 380 electrically connected to the first boost driving unit 310, the second boost driving unit 330 and the third boost driving unit 350. The first boost driving unit 310 is utilized for performing a first driving operation according to the input voltage Vin and the first control signal Sctr1. The first driving operation includes a first energy-storing operation and a first energy-releasing operation. The second boost driving unit 330 is utilized for performing a second driving operation according to the input voltage Vin and the second control signal Sctr2. The second driving operation includes a second energy-storing operation and a second energy-releasing operation. The third boost driving unit 350 is utilized for performing a third driving operation according to the input voltage Vin and the third control signal Sctr3. The third driving operation includes a third energy-storing operation and a third energy-releasing operation.

In the DC voltage boost operation of the DC/DC boost converter 300, when the first boost driving unit 310 performs the first energy-releasing operation for charging the capacitor 380, the second boost driving unit 330 performs the second energy-storing operation, and the third boost driving unit 350 performs the third energy-storing operation. When the second boost driving unit 330 performs the second energy-releasing operation for charging the capacitor 380, the first boost driving unit 310 performs the first energy-storing operation, and the third boost driving unit 350 performs the third energy-storing operation. Otherwise, when the third boost driving unit 350 performs the third energy-releasing operation for charging the capacitor 380, the first boost driving unit 310 performs the first energy-storing operation, and the second boost driving unit 330 performs the second energy-storing operation. That is, the first, second and third energy-releasing operations take turns charging the capacitor 380 so as to generate the output voltage Vout, thereby lowering the charging current provided by the first boost driving unit 310, the second boost driving unit 330 or the third boost driving unit 350, which leads to lower ripple of the output voltage Vout.

In the embodiment shown in FIG. 4, the first boost driving unit 310 comprises a first inductor 311, a first switch 313 and a first diode 315, the second boost driving unit 330 comprises a second inductor 331, a second switch 333 and a second diode 335, the third boost driving unit 350 comprises a third inductor 351, a third switch 353 and a third diode 355, and the capacitor 380 comprises a first end and a second end. The first end of the capacitor 380 is electrically connected to the first diode 315, the second diode 335 and the third diode 355, and the second end thereof is employed to receive a reference voltage Vref. The reference voltage Vref may be ground voltage. The first inductor 311 comprises a first end for receiving the input voltage Vin and a second end electrically connected to the first switch 313 and the first diode 315. The first switch 313 comprises a first end electrically connected to the second end of the first inductor 311, a gate end for receiving the first control signal Sctr1, and a second end for receiving a first reference voltage Vref1. The first switch 313 may be a field effect transistor or a thin film transistor. The first reference voltage Vref1 may be ground voltage. The first diode 315 comprises an anode electrically connected to the second end of the first inductor 311 and a cathode electrically connected to the first end of the capacitor 380.

The second inductor 331 comprises a first end for receiving the input voltage Vin and a second end electrically connected to the second switch 333 and the second diode 335. The second switch 333 comprises a first end electrically connected to the second end of the second inductor 331, a gate end for receiving the second control signal Sctr2, and a second end for receiving a second reference voltage Vref2. The second switch 333 may be a field effect transistor or a thin film transistor. The second reference voltage Vref2 may be ground voltage. The second diode 335 comprises an anode electrically connected to the second end of the second inductor 331 and a cathode electrically connected to the first end of the capacitor 380. The third inductor 351 comprises a first end for receiving the input voltage Vin and a second end electrically connected to the third switch 353 and the third diode 355. The third switch 353 comprises a first end electrically connected to the second end of the third inductor 351, a gate end for receiving the third control signal Sctr3, and a second end for receiving a third reference voltage Vref3. The third switch 353 may be a field effect transistor or a thin film transistor. The third reference voltage Vref3 may be ground voltage. The third diode 355 comprises an anode electrically connected to the second end of the third inductor 351 and a cathode electrically connected to the first end of the capacitor 380.

Figure 5:
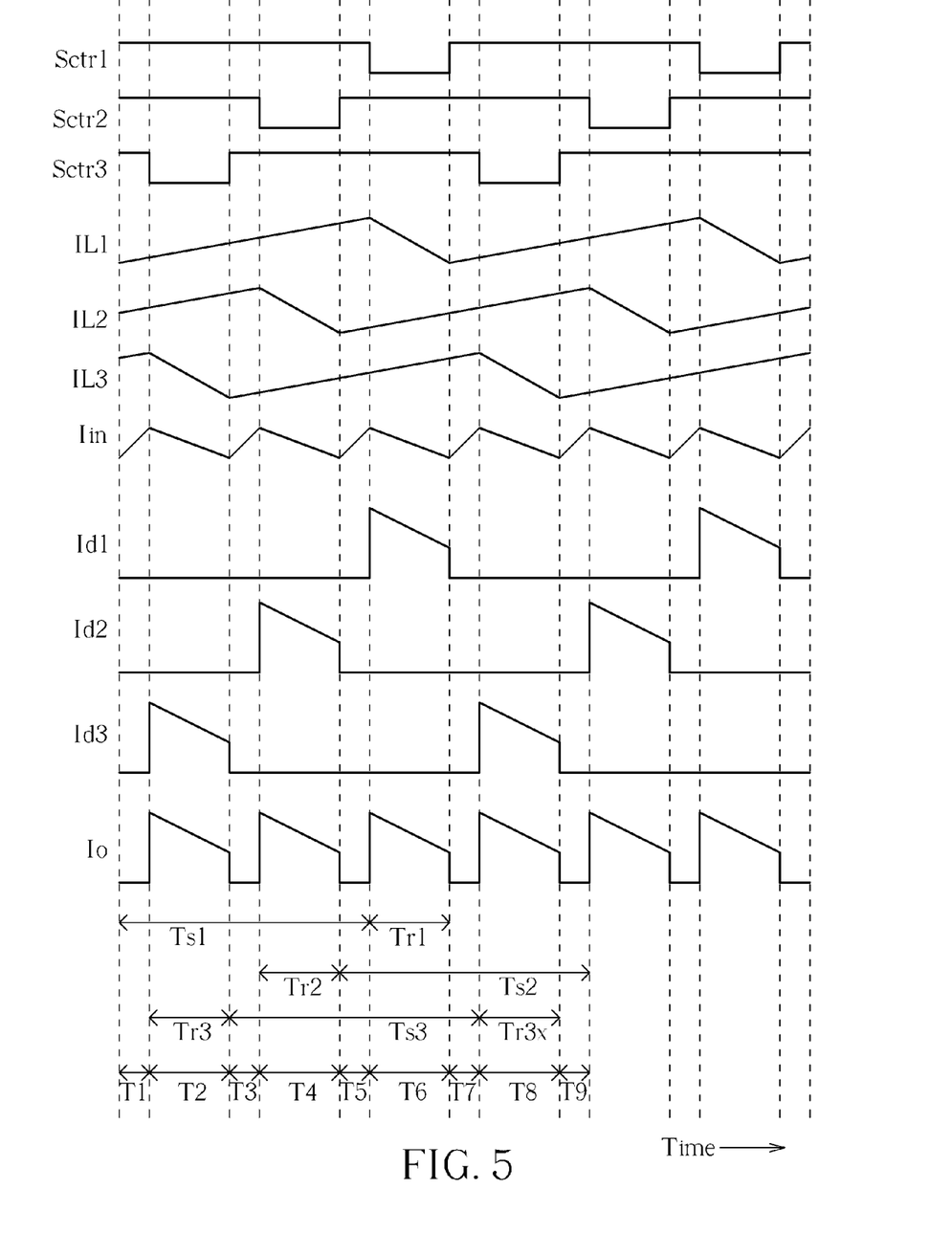
FIG. 5 is a schematic diagram showing related signal waveforms regarding the operation of the DC/DC boost converter illustrated in FIG. 4, having time along the abscissa.

FIG. 5 is a schematic diagram showing related signal waveforms regarding the operation of the DC/DC boost converter 300 illustrated in FIG. 4, having time along the abscissa. The signal waveforms in FIG. 5, from top to bottom, are the first control signal Sctr1, the second control signal Sctr2, the third control signal Sctr3, a first inductor current IL1, a second inductor current IL2, a third inductor current IL3, an input current Iin, a first diode current Id1, a second diode current Id2, a third diode current Id3, and an output current Io. Referring to FIG. 5 in conjunction with FIG. 4, during an interval T1, the first switch 313 is turned on according to the first control signal Sctr1 having a first level, the second switch 333 is turned on according to the second control signal Sctr2 having the first level, and the third switch 353 is turned on according to the third control signal Sctr3 having the first level, such that the first through third energy-storing operations can be performed to raise the first through third inductor currents IL1-IL3 of the first through third inductors 311, 331, 351 respectively, thereby increasing the input current Iin. Meanwhile, the first diode 315, the second diode 335 and the third diode 355 are all reversely biased.

During an interval T2, the first control signal Sctr1 having the first level continues turning on the first switch 313, the second control signal Sctr2 having the first level continues turning on the second switch 333, and the third switch 353 is turned off according to the third control signal Sctr3 having a second level different from the first level, such that the first and second energy-storing operations can be performed continuously to raise the first and second inductor currents IL1, IL2 respectively, and the third energy-releasing operation of the third inductor 351 can be performed to charge the capacitor 380 with the third inductor current IL3 flowing through the third diode 355. At this time, the decreasing rate of the third inductor current IL3 is significantly greater than the increasing rate of the first and second inductor currents IL1, IL2 so that the input current Iin is decreased. During an interval T3, the first control signal Sctr1 having the first level continues turning on the first switch 313, the second control signal Sctr2 having the first level continues turning on the second switch 333, and the third switch 353 is turned on according to the third control signal Sctr3 having the first level, such that the first through third energy-storing operations can be performed to raise the first through third inductor currents IL1-IL3 respectively, thereby increasing the input current Iin.

Meanwhile, the first diode 315, the second diode 335 and the third diode 355 are all reversely biased.

During an interval T4, the first control signal Sctr1 having the first level continues turning on the first switch 313, the third control signal Sctr3 having the first level continues turning on the third switch 353, and the second switch 333 is turned off according to the second control signal Sctr2 having the second level, such that the first and third energy-storing operations can be performed continuously to raise the first and third inductor currents IL1, IL3 respectively, and the second energy-releasing operation of the second inductor 331 can be performed to charge the capacitor 380 with the second inductor current IL2 flowing through the second diode 335. At this time, the decreasing rate of the second inductor current IL2 is significantly greater than the increasing rate of the first and third inductor currents IL1, IL3 so that the input current Iin is decreased. During an interval T5, the first control signal Sctr1 having the first level continues turning on the first switch 313, the third control signal Sctr3 having the first level continues turning on the third switch 353, and the second switch 333 is turned on according to the second control signal Sctr2 having the first level, such that the first through third energy-storing operations can be performed to raise the first through third inductor currents IL1-IL3 respectively, thereby increasing the input current Iin. Meanwhile, the first diode 315, the second diode 335 and the third diode 355 are all reversely biased.

During an interval T6, the second control signal Sctr2 having the first level continues turning on the second switch 333, the third control signal Sctr3 having the first level continues turning on the third switch 353, and the first switch 313 is turned off according to the first control signal Sctr1 having the second level, such that the second and third energy-storing operations can be performed continuously to raise the second and third inductor currents IL2, IL3 respectively, and the first energy-releasing operation of the first inductor 311 can be performed to charge the capacitor 380 with the first inductor current IL1 flowing through the first diode 315. At this time, the decreasing rate of the first inductor current IL1 is significantly greater than the increasing rate of the second and third inductor currents IL2, IL3 so that the input current Iin is decreased. During an interval T7, the second control signal Sctr2 having the first level continues turning on the second switch 333, the third control signal Sctr3 having the first level continues turning on the third switch 353, and the first switch 313 is turned on according to the first control signal Sctr1 having the first level, such that the first through third energy-storing operations can be performed to raise the first through third inductor currents IL1-IL3 respectively, thereby increasing the input current Iin. Meanwhile, the first diode 315, the second diode 335 and the third diode 355 are all reversely biased. The circuit operations of the DC/DC boost converter 300 during intervals T8 and T9 are identical to the aforementioned circuit operations during the intervals T2 and T3 respectively, and are not repeated here.

As shown in FIG. 5, a first energy-storing interval Ts1 for performing the first energy-storing operation includes the intervals T1-T5, a second energy-storing interval Ts2 for performing the second energy-storing operation includes the intervals T5-T9, a third energy-storing interval Ts3 for performing the third energy-storing operation includes the intervals T3-T7, a first energy-releasing interval Tr1 for performing the first energy-releasing operation is the interval T6, a second energy-releasing interval Tr2 for performing the second energy-releasing operation is the interval T4, a third energy-releasing interval Tr3 for performing the third energy-releasing operation is the interval T2, and a third energy-releasing interval Tr3x for performing the third energy-releasing operation is the interval T8. Accordingly, the first energy-releasing interval Tr1, the second energy-releasing interval Tr2 and the third energy-releasing interval Tr3/Tr3x are non-overlapped with each other, the first energy-storing interval Ts1 includes the second energy-releasing interval Tr2 and the third energy-releasing interval Tr3, the second energy-storing interval Ts2 includes the first energy-releasing interval Tr1 and the third energy-releasing interval Tr3x, and the third energy-storing interval Ts3 includes the first energy-releasing interval Tr1 and the second energy-releasing interval Tr2. That is, the DC/DC boost converter 300 employs the first through third energy-releasing operations to take turns charging the capacitor 380 for generating the output voltage Vout, thereby reducing the first inductor current IL1, the second inductor current IL2 and the third inductor current IL3. Thus, the output current Io for charging the capacitor 380 can be lowered to reduce the ripple of the output voltage Vout. For that reason, the DC/DC boost converter 300 can be constructed by components with low current/voltage rating to bring the cost down. Further, the ripple of the input current Iin can be reduced to mitigate electromagnetic interference, which results in lower electromagnetic energy loss and thus increases energy conversion efficiency. Besides, since the frequency of the first through third control signals Sctr1-Sctr3 can be set to one-third the frequency of the prior-art control signal Sctr shown in FIG. 1, the on/off state switching frequency of the first through third switches 313, 333, 353 is then significantly reduced for achieving extended lifetime thereof.

It is noted that the DC/DC boost converter of the present invention is not limited to the aforementioned embodiments based on two-phase/three-phase operation mechanism, and can be implemented based on operation mechanism of four-phase or more, i.e. the DC/DC boost converter of the present invention may be formed by more boost driving units connected in parallel to take turns performing DC voltage boost operation. In summary, the present invention provides a DC/DC boost converter based on multi-phase operation mechanism for mitigating electromagnetic interference, increasing energy conversion efficiency and extending switch lifetime. Further, the DC/DC boost converter of the present invention can be constructed by components with low current/voltage rating to bring the cost down.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A DC/DC boost converter, comprising:
 a first boost driving unit for performing a first driving operation according to an input voltage and a first control signal, wherein the first driving operation includes a first energy-storing operation and a first energy-releasing operation;
 a second boost driving unit, electrically connected in parallel with the first boost driving unit, for performing a second driving operation according to the input voltage and a second control signal different from the first control signal, wherein the second driving operation includes a second energy-storing operation and a second energy-releasing operation; and a capacitor, electrically connected to the first and second boost driving units, for generating an output voltage through performing a charging operation according to the first energy-releasing operation and the second energy-releasing operation;

wherein the first boost driving unit performs the first energy-storing operation during a first energy-storing interval, and performs the first energy-releasing operation during a first energy-releasing interval; and the second boost driving unit performs the second energy-storing operation during a second energy-storing interval, and performs the second energy-releasing operation during a second energy-releasing interval completely not overlapped with the first energy-releasing interval.

2. The DC/DC boost converter of claim 1, wherein the first energy-storing interval includes the second energy-releasing interval, and the second energy-storing interval includes the first energy-releasing interval.

3. The DC/DC boost converter of claim 1, wherein the first boost driving unit comprises:
   a first inductor having a first end for receiving the input voltage, and a second end;
   a first switch having a first end electrically connected to the second end of the first inductor, a gate end for receiving the first control signal, and a second end for receiving a first reference voltage; and
   a first diode having an anode electrically connected to the second end of the first inductor, and a cathode electrically connected to the capacitor.

4. The DC/DC boost converter of claim 1, wherein the second boost driving unit comprises:
   a second inductor having a first end for receiving the input voltage, and a second end;
   a second switch having a first end electrically connected to the second end of the second inductor, a gate end for receiving the second control signal, and a second end for receiving a second reference voltage; and
   a second diode having an anode electrically connected to the second end of the second inductor, and a cathode electrically connected to the capacitor.

5. The DC/DC boost converter of claim 1, wherein the capacitor has a first end electrically connected to the first and second boost driving units, and a second end for receiving a reference voltage.

6. The DC/DC boost converter of claim 1, further comprising:
   a third boost driving unit, electrically connected in parallel with the first boost driving unit, for performing a third driving operation according to the input voltage and a third control signal different from the first and second control signals, wherein the third driving operation includes a third energy-storing operation and a third energy-releasing operation.

7. The DC/DC boost converter of claim 6, wherein:
   the third boost driving unit performs the third energy-storing operation during a third energy-storing interval, and performs the third energy-releasing operation during a third energy-releasing interval completely not overlapped with the first and second energy-releasing intervals.

8. The DC/DC boost converter of claim 7, wherein the first energy-storing interval includes the second and third energy-releasing intervals, the second energy-storing interval includes the first and third energy-releasing intervals, and the third energy-storing interval includes the first and second energy-releasing intervals.

9. The DC/DC boost converter of claim 6, wherein the third boost driving unit comprises:
   a third inductor having a first end for receiving the input voltage, and a second end;
   a third switch having a first end electrically connected to the second end of the third inductor, a gate end for receiving the third control signal, and a second end for receiving a third reference voltage; and
   a third diode having an anode electrically connected to the second end of the third inductor, and a cathode electrically connected to the capacitor.

* * * * *